(12) United States Patent
Sugihara

(10) Patent No.: US 12,308,436 B2
(45) Date of Patent: *May 20, 2025

(54) METHOD OF PRODUCING NEGATIVE ELECTRODE, NEGATIVE ELECTRODE, AND LITHIUM-ION SECONDARY BATTERY

(71) Applicant: TOYOTA JIDOSHA KABUSHIKI KAISHA, Toyota (JP)

(72) Inventor: Atsushi Sugihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,508

(22) Filed: Mar. 11, 2024

(65) Prior Publication Data

US 2024/0222638 A1     Jul. 4, 2024

Related U.S. Application Data

(63) Continuation of application No. 17/060,588, filed on Oct. 1, 2020, now Pat. No. 11,962,012, which is a continuation of application No. 16/175,044, filed on Oct. 30, 2018, now Pat. No. 10,833,331.

(30) Foreign Application Priority Data

Nov. 1, 2017    (JP) ................................ 2017-212008

(51) Int. Cl.
*H01M 4/62*      (2006.01)
*H01M 4/02*      (2006.01)
(Continued)

(52) U.S. Cl.
CPC ........... *H01M 4/625* (2013.01); *H01M 4/131* (2013.01); *H01M 4/1391* (2013.01); *H01M 4/485* (2013.01); *H01M 10/0525* (2013.01); *H01M 2004/027* (2013.01)

(58) Field of Classification Search
CPC .......... H01M 4/04; H01M 4/13; H01M 4/131; H01M 4/133; H01M 4/134; H01M 4/136;
(Continued)

(56) References Cited

U.S. PATENT DOCUMENTS

| | | |
|---|---|---|
| 2001/0014422 A1 | 8/2001 | Omaru et al. |
| 2014/0370387 A1 | 12/2014 | Anguchamy et al. |
| 2016/0268589 A1 | 9/2016 | Do et al. |
| 2019/0131628 A1 | 5/2019 | Sugihara |
| 2021/0020948 A1 | 1/2021 | Sugihara |

FOREIGN PATENT DOCUMENTS

| | | |
|---|---|---|
| JP | S63187568 A | 8/1988 |
| JP | 2001-126727 A | 5/2001 |

(Continued)

OTHER PUBLICATIONS

Final Office Action dated Apr. 14, 2022, Issued to U.S. Appl. No. 17/060,588, filed Oct. 1, 2020.
(Continued)

*Primary Examiner* — Miriam Stagg
*Assistant Examiner* — Lilia Nedialkova
(74) *Attorney, Agent, or Firm* — Dinsmore & Shohl LLP

(57) ABSTRACT

A method of producing a negative electrode includes at least the following (A) to (C): (A) mixing powder consisting of lithium titanate oxide particles, a binder, and a solvent to prepare a particle-dispersed liquid; (B) granulating powder consisting of graphite-based particles by using the particle-dispersed liquid to prepare wet granules; and (C) forming the wet granules into a negative electrode composite material layer to produce a negative electrode. The negative electrode composite material layer is formed so as to include the lithium titanate oxide particles in an amount not lower than 2 mass % and not higher than 15 mass % of the total amount of the graphite-based particles and the lithium titanate oxide particles.

10 Claims, 4 Drawing Sheets

(51) Int. Cl.
  *H01M 4/131* (2010.01)
  *H01M 4/1391* (2010.01)
  *H01M 4/485* (2010.01)
  *H01M 10/0525* (2010.01)

(58) Field of Classification Search
  CPC .... H01M 4/137; H01M 4/139; H01M 4/1391; H01M 4/485; H01M 4/625; H01M 10/0525; Y02E 60/10
  See application file for complete search history.

(56) References Cited

FOREIGN PATENT DOCUMENTS

| | | |
|---|---|---|
| JP | 2015-201318 A | 11/2015 |
| JP | 2016-213094 A | 12/2016 |
| KR | 1020150083635 A | 7/2015 |
| KR | 1020170056655 A | 5/2017 |
| WO | 2016/051662 A1 | 4/2016 |

OTHER PUBLICATIONS

Non-Final Office Action dated Apr. 27, 2023, Issued to U.S. Appl. No. 17/060,588, filed Oct. 1, 2020.
Non-Final Office Action dated Sep. 27, 2021, Issued to U.S. Appl. No. 17/060,588, filed Oct. 1, 2020.
Notice of Allowance dated Dec. 13, 2023, Issued to U.S. Appl. No. 17/060,588, filed Oct. 1, 2020.
Notice of Allowance dated Jul. 27, 2020, Issued to U.S. Appl. No. 16/175,044, filed Oct. 30, 2018.

METHOD OF PRODUCING NEGATIVE ELECTRODE, NEGATIVE ELECTRODE, AND LITHIUM-ION SECONDARY BATTERY

CROSS-REFERENCE TO RELATED APPLICATIONS

The present application is a continuation application of U.S. patent application Ser. No. 17/060,588 filed Oct. 1, 2020, which is a divisional application of U.S. patent application Ser. No. 16/175,044, filed Oct. 30, 2018, now U.S. Pat. No. 10,833,331 issued Nov. 10, 2020, which claims priority to Japanese Patent Application No. 2017-212008, filed on Nov. 1, 2017, the entire contents of both of which are hereby incorporated by reference in the present application.

BACKGROUND

Field

The present disclosure relates to a method of producing a negative electrode, a negative electrode, and a lithium-ion secondary battery.

Description of the Background Art

Japanese Patent Laying-Open No. 2001-126727 discloses a lithium-ion secondary battery that is produced by using a negative electrode material containing a mixture of lithium titanate oxide and amorphous carbon.

SUMMARY

Heat generation in a lithium-ion secondary battery may be inhibited by maintaining the amount of a short-circuit current that flows at the time of an internal short circuit low.

In conventional negative electrode active materials of lithium-ion secondary batteries, graphite-based particles are used. Graphite-based particles have a high electronic conductivity. Therefore, graphite-based particles have a low electronic resistance between them. It is considered that such properties allow a high amount of short-circuit current to flow.

As a negative electrode active material, lithium titanate oxide (LTO) particles are also known. Characteristically, LTO particles increase their resistance at the time of a short circuit. Therefore in a battery containing a mixture of graphite-based particles and LTO particles, the amount of short-circuit current is low.

A short-circuit current flows selectively in an area with a low resistance. Therefore, it is considered that even when LTO particles are used and mixed with graphite-based particles, a short-circuit current flows in an area where graphite-based particles are in contact with each other. Therefore, it is considered that in order to reduce the area where graphite-based particles are in contact with each other, a large quantity of LTO particles are included. Meanwhile, the specific capacity (capacity per unit mass) of LTO particles is lower than that of graphite-based particles. For this reason, it is considered that a battery containing a large quantity of LTO particles has a low battery capacity.

An object of the present disclosure is to inhibit heat generation at the time of a short circuit while also inhibiting a decrease in battery capacity.

In the following, the technical structure and the effects according to the present disclosure are described. It should be noted that part of the action mechanism according to the present disclosure is based on presumption. Therefore, the scope of claims for patent should not be limited by whether or not the action mechanism is correct.

[1] A method of producing a negative electrode according to the present disclosure is a method of producing a negative electrode of a lithium-ion secondary battery.

The method of producing a negative electrode according to the present disclosure includes at least the following (A) to (C):

(A) mixing powder consisting of lithium titanate oxide particles, a binder, and a solvent to prepare a particle-dispersed liquid;

(B) granulating powder consisting of graphite-based particles by using the particle-dispersed liquid to prepare wet granules; and (C) forming the wet granules into a negative electrode composite material layer to produce a negative electrode.

The negative electrode composite material layer includes the lithium titanate oxide particles in an amount not lower than 2 mass % and not higher than 15 mass % of a total amount of the graphite-based particles and the lithium titanate oxide particles.

In general, a negative electrode composite material layer of a lithium-ion secondary battery is formed by coating a surface of a negative electrode current collector with paste (also called "slurry"). The paste refers to a suspension in which particles (solid) are evenly dispersed in a solvent (liquid). It is considered that in the negative electrode composite material layer formed by paste coating, the location of each constituent material is difficult to control.

In the method of producing a negative electrode according to the present disclosure, the wet granules are formed into the negative electrode composite material layer. The wet granules are not paste. Each wet granule is an assembly of agglomerated particles and formed by granulation of powder, and the "wet granules" state refers to a state in which a solvent (liquid) is dispersed between the agglomerated particles (solid). When the wet granules are used, each constituent material of the negative electrode composite material layer may be positioned at a specific location.

FIG. 1 is a conceptual view showing the wet granules according to the present disclosure.

In the method of producing a negative electrode according to the present disclosure, powder consisting of graphite-based particles 1 is granulated by using the particle-dispersed liquid. The particle-dispersed liquid contains LTO particles 2, a binder (not shown), and a solvent 3. During the granulation process, liquid linkage portions 5 are formed between graphite-based particles 1. Liquid linkage portions 5 consist of the particle-dispersed liquid. Formation of liquid linkage portions 5 leads to formation of an agglomerate of graphite-based particles 1 (more specifically, the agglomerate is a wet granule 20).

FIG. 2 is a conceptual cross-sectional view showing the negative electrode according to the present disclosure.

Wet granules 20 (FIG. 1) are formed into a negative electrode composite material layer 202. Negative electrode composite material layer 202 includes graphite-based particles 1 and linkage portions 10. Each graphite-based particle 1 is linked to another via one of linkage portions 10. Linkage portions 10 originate from liquid linkage portions 5 (FIG. 1). In other words, linkage portions 10 include LTO particles 2 and the binder.

It is considered that a short-circuit current, when occurs in a negative electrode 200, flows between graphite-based particles 1 through linkage portions 10. Linkage portions 10 contain LTO particles 2, the resistance of which increases at the time of a short circuit. It is considered that this increase in resistance inhibits a short-circuit current from flowing. Because LTO particles 2 are localized within linkage portions 10, which serve as the paths of short-circuit currents, the LTO particles 2 are capable of efficiently exerting their inhibitory effect on short-circuit currents. In other words, it is considered that the method of producing a negative electrode according to the present disclosure can inhibit heat generation at the time of a short circuit while also inhibiting a decrease in battery capacity.

Negative electrode composite material layer 202 is formed so as to include LTO particles 2 in an amount not lower than 2 mass % and not higher than 15 mass % of the total amount of graphite-based particles 1 and LTO particles 2. When the mass ratio of LTO particles 2 is higher than 15 mass %, the battery capacity can be very low. When the mass ratio of LTO particles 2 is lower than 2 mass %, inhibition of heat generation at the time of a short circuit can be insufficient.

FIG. 3 is a conceptual cross-sectional view showing a negative electrode according to a reference embodiment.

A negative electrode composite material layer 1202 is formed by paste coating. Negative electrode composite material layer 1202 has many contact areas where graphite-based particles 1 are in contact with each other. LTO particles 2 tend to enter the space between graphite-based particles 1. It is considered that in order to reduce contact areas where graphite-based particles 1 are in contact with each other, a large quantity of LTO particles 2 is used within negative electrode composite material layer 1202.

[2] The particle-dispersed liquid may be prepared so as to have a viscosity not lower than 4300 mPa·s and not higher than 7000 mPa·s. When the viscosity is within this range, the extent of heat generation at the time of a short circuit may be low.

[3] A ratio of a D50 of the powder consisting of graphite-based particles to a D50 of the powder consisting of lithium titanate oxide particles may be not lower than 20 and not higher than 250. When the ratio is within this range, the extent of heat generation at the time of a short circuit is low. Hereinafter, the "ratio of a D50 of powder consisting of graphite-based particles to a D50 of powder consisting of LTO particles" may also be called "particle size ratio $(D50_{Gr}/D50_{LTO})$".

[4] The negative electrode composite material layer may be formed so as to include lithium titanate oxide particles in an amount not lower than 3 mass % and not higher than 10 mass % of the total amount of the graphite-based particles and the lithium titanate oxide particles. When the amount of the lithium titanate oxide particles is within this range, an improved balance may be obtained between the extent of inhibition of heat generation and the battery capacity.

[5] The negative electrode according to the present disclosure is a negative electrode of a lithium-ion secondary battery.

The negative electrode includes at least a negative electrode composite material layer. The negative electrode composite material layer includes graphite-based particles, lithium titanate oxide particles, and a binder. The negative electrode composite material layer includes the lithium titanate oxide particles in an amount not lower than 2 mass % and not higher than 15 mass % of a total amount of the graphite-based particles and the lithium titanate oxide particles. An amount of electric current flowing across an interface between adjacent ones of the graphite-based particles measured in a cross section of the negative electrode composite material layer with a scanning probe microscope is not higher than 218 nA.

Hereinafter, the "amount of electric current measured in a cross section of the negative electrode composite material layer with a scanning probe microscope (SPM)" may also be called "SPM electric-current amount". When graphite-based particles 1, LTO particles 2, and the binder are positioned in negative electrode composite material layer 202 in such a way that the SPM electric-current amount measured across an interface between adjacent ones of graphite-based particles 1 is not higher than 218 nA, the heat generation at the time of a short circuit is inhibited while a decrease in battery capacity is also inhibited.

When adjacent ones of graphite-based particles 1 are in direct contact with each other, the "interface" refers to the area of contact. When adjacent ones of graphite-based particles 1 are not in direct contact with each other, the "interface" refers to an area across which these adjacent ones of graphite-based particles 1 come closest to each other.

Negative electrode composite material layer 202 includes LTO particles 2 in an amount not lower than 2 mass % and not higher than 15 mass % of the total amount of graphite-based particles 1 and LTO particles 2. When the mass ratio of LTO particles 2 is higher than 15 mass %, battery capacity can be very low. When the mass ratio of LTO particles 2 is lower than 2 mass %, inhibition of heat generation at the time of a short circuit can be insufficient.

[6] The SPM electric-current amount may be not lower than 13 nA and not higher than 75 nA. When the SPM electric-current amount is within this range, the extent of heat generation at the time of a short circuit is very low.

[7] The negative electrode composite material layer may further include linkage portions. Each graphite-based particle is linked to another via one of the linkage portions. The lithium titanate oxide particles and the binder are contained in the linkage portions.

When these constituent materials are thus positioned, the extent of heat generation at the time of a short circuit is low. The reason is considered to be as follows: these constituent materials being thus positioned means that linkage portions 10 are included in the paths of short-circuit currents; and because LTO particles 2 having their resistance increasing at the time of a short circuit are thus localized within linkage portions 10, only a low amount of short-circuit current can flow.

It is also considered that when these constituent materials are thus positioned, an SPM electric-current amount measured across an interface between adjacent ones of graphite-based particles 1 is low as well. The reason is considered to be that when these constituent materials are thus positioned, linkage portions 10 can serve as interfaces between adjacent ones of graphite-based particles 1.

[8] The negative electrode composite material layer may include the lithium titanate oxide particles in an amount not lower than 3 mass % and not higher than 10 mass % of the total amount of the graphite-based particles and the lithium titanate oxide particles. When the amount is within this range, an improved balance is obtained between the extent of inhibition of heat generation and the battery capacity.

[9] A lithium-ion secondary battery according to the present disclosure includes at least the negative electrode as described in any one of [5] to [8] above. The lithium-ion secondary battery according to the present disclosure has an acceptable level of battery capacity and produces only a low amount of heat at the time of a short circuit.

The foregoing and other objects, features, aspects and advantages of the present disclosure will become more apparent from the following detailed description of the present disclosure when taken in conjunction with the accompanying drawings.

DESCRIPTION OF THE EMBODIMENTS

In the following, embodiments according to the present disclosure (herein called "present embodiments") are described. It should be noted that the following description does not limit the scope of claims.

<Method of Producing Negative Electrode>

Figure 4:
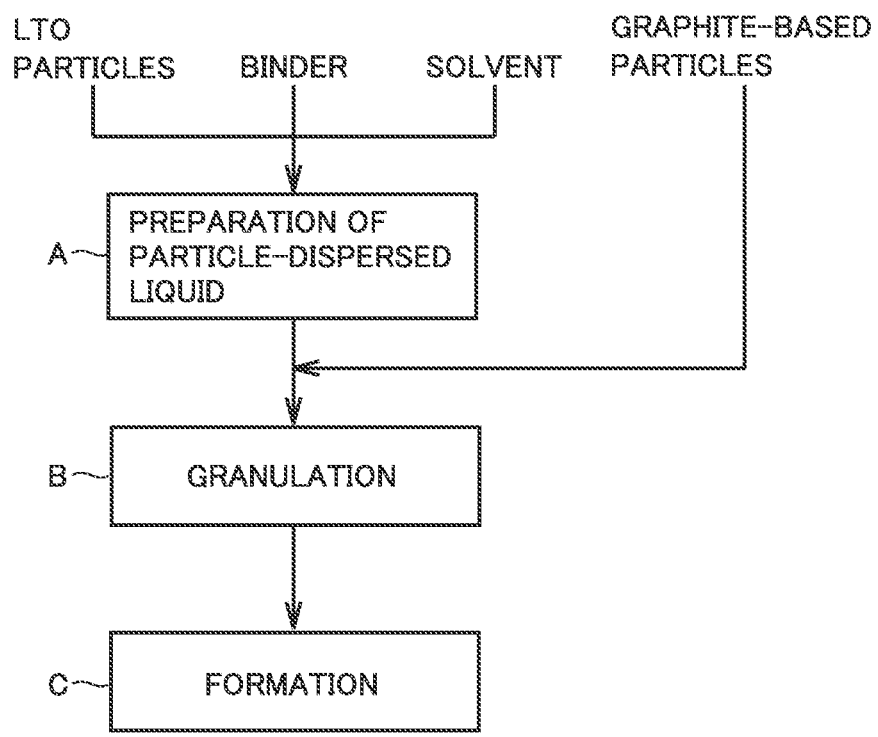
FIG. 4 is an example of a flow chart for production of the negative electrode according to the present embodiment.

FIG. 4 is an example of a flow chart of production of a negative electrode according to the present embodiment.

The method of producing a negative electrode according to the present embodiment includes at least "(A) preparation of a particle-dispersed liquid", "(B) granulation", and "(C) formation".

<<(A) Preparation of Particle-Dispersed Liquid>>

The method of producing a negative electrode according to the present embodiment includes mixing powder consisting of LTO particles 2, a binder, and a solvent to prepare a particle-dispersed liquid.

(Stirrer)

The mixing the powder consisting of LTO particles 2, the binder, and the solvent so as to prepare the particle-dispersed liquid may be carried out with the use of, for example, a stirrer. The stirrer according to the present embodiment is capable of loosening agglomeration of the powder consisting of LTO particles 2 and inhibiting reagglomeration of LTO particles 2. When reagglomeration of LTO particles 2 is inhibited, heat generation at the time of a short circuit is low. The stirrer according to the present embodiment may be a "Filmix" mixer manufactured by PRIMIX Corporation or a similar product, for example.

(Lithium Titanate Oxide Particles)

LTO particles 2 are a negative electrode active material. Characteristically, the resistance of LTO particles 2 increases at the time of a short circuit. LTO particles 2 refer to particles of lithium titanate oxide. The lithium titanate oxide according to the present embodiment may have any known composition. For example, the lithium titanate oxide may be $Li_4Ti_5O_{12}$. The shape of LTO particles 2 (primary particles) is not particularly limited. For example, the shape of LTO particles 2 (primary particles) may be spherical, plate-like, rod-like, or needle-like.

The powder consisting of LTO particles 2 may have a D50 not lower than 0.01 μm and not higher than 1 μm, for example. The D50 is measured by laser diffraction and scattering. The D50 measured by laser diffraction and scattering refers to the particle size in volume-based particle size distribution at which the cumulative particle volume (accumulated from the side of small sizes) reaches 50% of the total particle volume. The "D50 of the powder consisting of LTO particles 2" herein refers to the values measured using the primary particles. In other words, the "D50 of the powder consisting of LTO particles 2" is the "D50 of the primary particle size". The D50 may be measured by dynamic light scattering. The D50 measured by dynamic light scattering is a harmonic mean particle size (diameter) based on scattering light intensity.

(Binder and Solvent)

The binder is not particularly limited. For example, the binder may be styrene-butadiene rubber (SBR), carboxymethylcellulose (CMC), polyvinyl alcohol (PVA), polyvinylidene difluoride (PVdF), vinylidene fluoride-hexafluoropropene copolymer (PVDF-HFP), polytetrafluoroethylene (PTFE), polyimide (PI), polyacrylic acid (PAA), or acrylic polymer. The acrylic polymer refers to a polymer formed by polymerization of at least one monomer selected from the group consisting of acrylic acid esters, methacrylic acid esters, and acrylonitrile.

The binder may be in powder form. The binder may be in solution form. One type of the binder may be used alone. Two or more types of the binder may be used in combination. For example, a binder (thickening component) capable of imparting viscosity to the particle-dispersed liquid and a binder having a high binding capability may be used in combination. Examples of the thickening component include CMC, PVA, and PAA. The mixing ratio of LTO particles 2 and the binder may satisfy, for example, "(LTO particles):(binder)=3:2.5 to 30:2.5 (mass ratio)".

The solvent is selected as appropriate depending on the type of the binder. For example, the solvent may be water or N-methyl-2-pyrrolidone (NMP).

(Solid Matter Ratio of Particle-Dispersed Liquid)

The particle-dispersed liquid may be prepared so as to have a solid matter ratio not lower than 3.6 mass % and not higher than 27 mass %, for example. The solid matter ratio refers to the mass ratio of a component or components (solid matter) except the solvent. The particle-dispersed liquid may be prepared so as to have a solid matter ratio not lower than 5.4 mass % and not higher than 18 mass %, for example.

(Viscosity)

The particle-dispersed liquid may be prepared so as to have a viscosity not lower than 2300 mPa·s and not higher than 9200 mPa·s, for example. The viscosity of the particle-dispersed liquid can be adjusted by changing conditions during dispersion (such as the stirring rate, the stirring duration, the solid matter ratio, and the amount of the thickening component). The viscosity of the particle-dispersed liquid is measured with a typical rotational rheometer. The temperature during the measurement is 20° C.±5° C. The shear rate is 2 $s^{-1}$. The viscosity is measured at least three times. The arithmetic mean of these at least three measurements is used as the viscosity of the particle-dispersed liquid.

The particle-dispersed liquid may be prepared so as to have a viscosity not lower than 4300 mPa·s and not higher than 7000 mPa·s. When the viscosity is within this range, heat generation at the time of a short circuit is low.

<<(B) Granulation>>

The method of producing a negative electrode according to the present embodiment includes granulating powder consisting of graphite-based particles 1 by using the particle-dispersed liquid to prepare wet granules 20.

(Granulator)

Granulation proceeds during the particle-dispersed liquid and the powder consisting of graphite-based particles 1 are mixed in, for example, a stirring granulator. As the stirring granulator, "High Speed Mixer" or "High Flex Gral" manufactured by Earthtechnica Co., Ltd. or a similar product may be used, for example.

Figure 1:
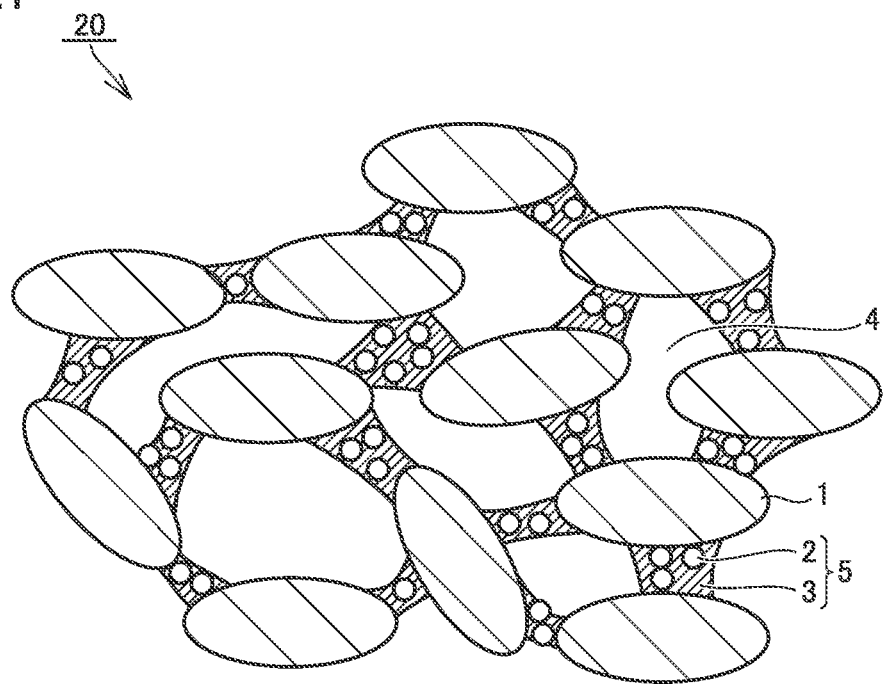
FIG. 1 is a conceptual view showing wet granules according to the present disclosure.

During granulation, a liquid linkage portion 5 is formed between graphite-based particle 1 and graphite-based particle 1 (FIG. 1). Liquid linkage portion 5 consists of the particle-dispersed liquid. In other words, liquid linkage portion 5 contains LTO particles 2, the binder, and a solvent 3. It is considered that graphite-based particles 1 are linked to each other via liquid linkage portions 5 and thereby wet granules 20 are formed.

In some embodiments, wet granules 20 are formed so that they include spaces 4. It is considered that when wet granules 20 include spaces 4, graphite-based particles 1 may be linked to each other via liquid linkage portions 5 with no direct contact between graphite-based particles 1. The amount of spaces 4 formed can be adjusted by changing conditions during granulation (such as the solid matter ratio, the viscosity of the particle-dispersed liquid, the stirring rate, and the stirring duration).

The granule size of wet granules 20 may also be adjusted by changing conditions during granulation. For example, the average granule size (average diameter) may be not smaller than 0.1 mm and not greater than 5 mm. The average granule size refers to the particle size in mass-based particle size distribution measured in accordance with "JIS K 0069: Test methods for sieving of chemical products" at which the cumulative mass (accumulated from the side of small sizes) reaches 50% of the total mass.

(Graphite-Based Particles)

Graphite-based particles 1 are a negative electrode active material. Graphite-based particles 1 according to the present embodiment include a graphite structure. The graphite structure refers to a crystal structure consisting of carbon hexagonal net planes stacked atop one another. The distance between the carbon hexagonal net planes is not particularly limited. Graphite-based particles 1 according to the present embodiment may contain natural graphite, artificial graphite, soft carbon, or hard carbon, for example.

Graphite-based particles 1 may also contain amorphous carbon as long as the graphite-based particles include the graphite structure. For example, graphite-based particles 1 may be coated on a surface thereof with amorphous carbon. The particle shape of graphite-based particles 1 is not particularly limited. Graphite-based particles 1 may be spherical, in flakes, or in lumps, for example. The powder consisting of graphite-based particles 1 may have a D50 not lower than 1 μm and not higher than 30 μm, for example.

(Particle Size Ratio ($D50_{Gr}/D50_{LTO}$))

In the present embodiment, a ratio of a D50 of the powder consisting of graphite-based particles 1 to the D50 of the powder consisting of LTO particles 2, in other words, a particle size ratio ($D50_{Gr}/D50_{LTO}$) may be not lower than 20 and not higher than 250. When the particle size ratio is within this range, heat generation at the time of a short circuit is low.

For example, the particle size ratio ($D50_{Gr}/D50_{LTO}$) may be not lower than 100. For example, the particle size ratio ($D50_{Gr}/D50_{LTO}$) may be not lower than 150. When the particle size ratio is within these ranges, heat generation at the time of a short circuit is may be even lower.

(Mass Ratio of Lithium Titanate Oxide Particles)

The mass ratio of LTO particles 2 to the total of graphite-based particles 1 and LTO particles 2 is not lower than 2 mass % and not higher than 15 mass %. In other words, in the present embodiment, a negative electrode composite material layer 202 is formed so as to include LTO particles 2 in an amount not lower than 2 mass % and not higher than 15 mass % of the total amount of graphite-based particles 1 and LTO particles 2. When the mass ratio of LTO particles 2 is higher than 15 mass %, battery capacity can be very low. When the mass ratio of LTO particles 2 is lower than 2 mass %, inhibition of heat generation at the time of a short circuit can be insufficient.

Negative electrode composite material layer 202 may be formed so as to include LTO particles 2 in an amount not lower than 3 mass % and not higher than 10 mass % of the total amount of graphite-based particles 1 and LTO particles 2. When the amount is within this range, an improved balance is obtained between the extent of inhibition of heat generation and the battery capacity.

(Solid Matter Ratio of Wet Granules)

The solid matter ratio during granulation is adjusted so that wet granules 20 are formed with no paste formation. The solid matter ratio during granulation can be adjusted by changing the amount of the particle-dispersed liquid mixed and the solid matter ratio of the particle-dispersed liquid, for example. When the solid matter ratio during granulation is too low (namely, when too much solvent is used), the mixture may form paste.

For example, wet granules 20 may be prepared so as to have a solid matter ratio not lower than 60 mass % and not higher than 90 mass %. For example, wet granules 20 may be prepared so as to have a solid matter ratio not lower than 60 mass % and not higher than 80 mass %. For example, wet granules 20 may be prepared so as to have a solid matter ratio not lower than 65 mass % and not higher than 70 mass %.

<<(C) Formation>>

The method of producing a negative electrode according to the present embodiment includes forming wet granules 20 into negative electrode composite material layer 202 to produce a negative electrode 200.

Formation of wet granules 20 into negative electrode composite material layer 202 is carried out by, for example, feeding wet granules 20 into the space between a pair of rolls. Thus, negative electrode 200 is produced. Negative electrode 200 may include a negative electrode current collector 201. In the present embodiment, wet granules 20 may be formed into negative electrode composite material layer 202, followed by placement of the resulting negative electrode composite material layer 202 on a surface of negative electrode current collector 201; wet granules 20 may be placed on a surface of negative electrode current collector 201, followed by formation of wet granules 20 into negative electrode composite material layer 202; or placement of wet granules 20 on a surface of negative electrode current collector 201 may be carried out substantially simultaneously with formation of wet granules 20 into negative electrode composite material layer 202.

Figure 5:
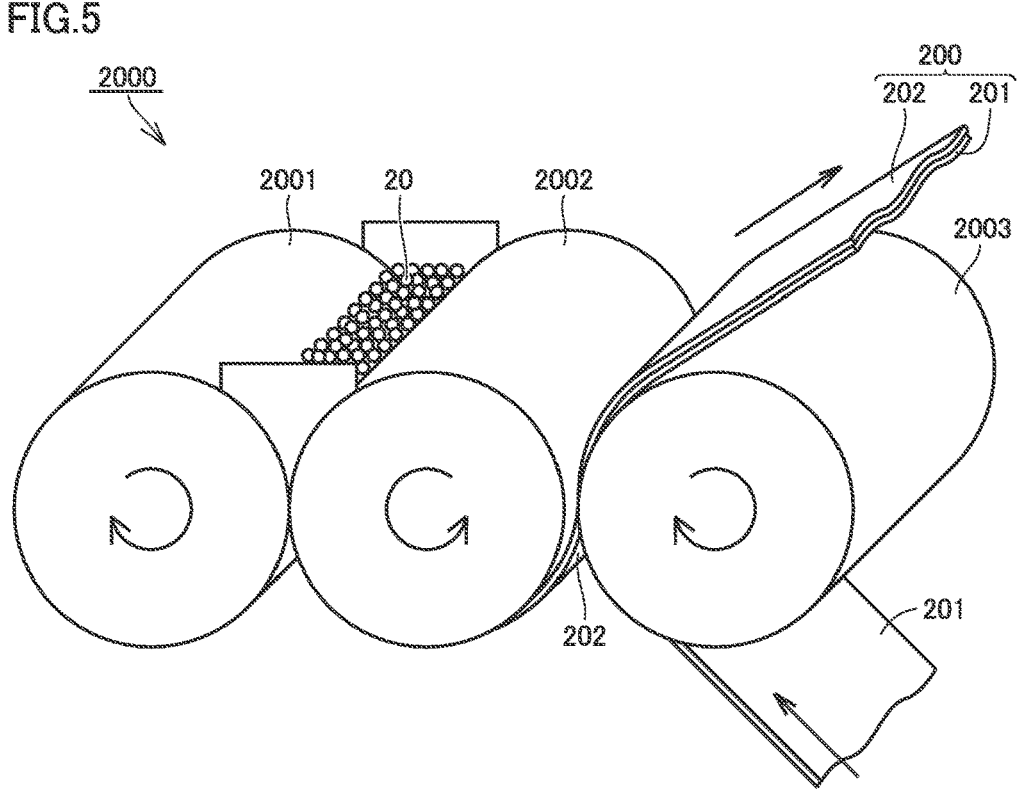
FIG. 5 is a schematic view showing an example of a formation method according to the present embodiment.

FIG. 5 is a schematic view showing an example of a formation method according to the present embodiment.

An electrode production apparatus 2000 includes three rolls. A first roll 2001, a second roll 2002, and a third roll 2003 are positioned such that their rotational axes are parallel to each other. Each roll rotates in the direction shown by the arrow on the roll. For example, second roll 2002 may have a circumferential velocity higher than that of first roll 2001. For example, third roll 2003 may have a circumferential velocity higher than that of second roll 2002.

Wet granules 20 are fed into the gap between first roll 2001 and second roll 2002. Within this gap, wet granules 20 are formed into a layer. More specifically, wet granules 20 are formed into negative electrode composite material layer 202. The resulting negative electrode composite material layer 202 is transferred by second roll 2002.

Negative electrode composite material layer 202 is fed into the gap between second roll 2002 and third roll 2003. Into that gap, negative electrode current collector 201 is also fed. Negative electrode current collector 201 is transferred by third roll 2003. Within this gap, negative electrode composite material layer 202 is forced onto the surface of negative electrode current collector 201. By this process, negative electrode composite material layer 202 comes off the surface of second roll 2002 and then negative electrode composite material layer 202 moves onto the surface of negative electrode current collector 201. More specifically, negative electrode composite material layer 202 is placed on the surface of negative electrode current collector 201.

A thickness of negative electrode composite material layer 202 can be adjusted by changing, for example, each gap width and/or the circumferential velocity of each roll. Any solvent remaining in negative electrode composite material layer 202 is removed by drying. The drying may be hot air drying. The drying may be air drying.

Negative electrode 200 may be treated so that it has predetermined outer dimensions. For example, negative electrode 200 may be rolled. For example, negative electrode 200 may be cut. Thus, negative electrode 200 according to the present embodiment is produced.

<Negative Electrode>

Negative electrode 200 according to the present embodiment is a negative electrode of a lithium-ion secondary battery. Negative electrode 200 has a sheet form. Negative electrode 200 includes at least negative electrode composite material layer 202. Negative electrode 200 may further include negative electrode current collector 201.

<<Negative Electrode Current Collector>>

Negative electrode current collector 201 may be made of copper (Cu) foil or Cu alloy foil, for example. Negative electrode current collector 201 may have a thickness not smaller than 5 μm and not greater than 50 μm, for example. The thickness of each component herein is measured with a micrometer, for example. The thickness of each component may be measured in, for example, a cross-sectional image observed with a microscope. Thickness measurement is carried out at at least three positions. The arithmetic mean of these at least three thickness measurements is used as the thickness of the component.

<<Negative Electrode Composite Material Layer>>

Negative electrode composite material layer 202 may be placed on a surface of negative electrode current collector 201. Negative electrode composite material layer 202 may be placed on both sides of negative electrode current collector 201. For example, negative electrode composite material layer 202 may have a thickness not smaller than 10 μm and not greater than 1 mm. For example, negative electrode composite material layer 202 may have a thickness not smaller than 50 μm and not greater than 500 μm. For example, negative electrode composite material layer 202 may have a thickness not smaller than 100 μm and not greater than 200 μm.

Figure 2:
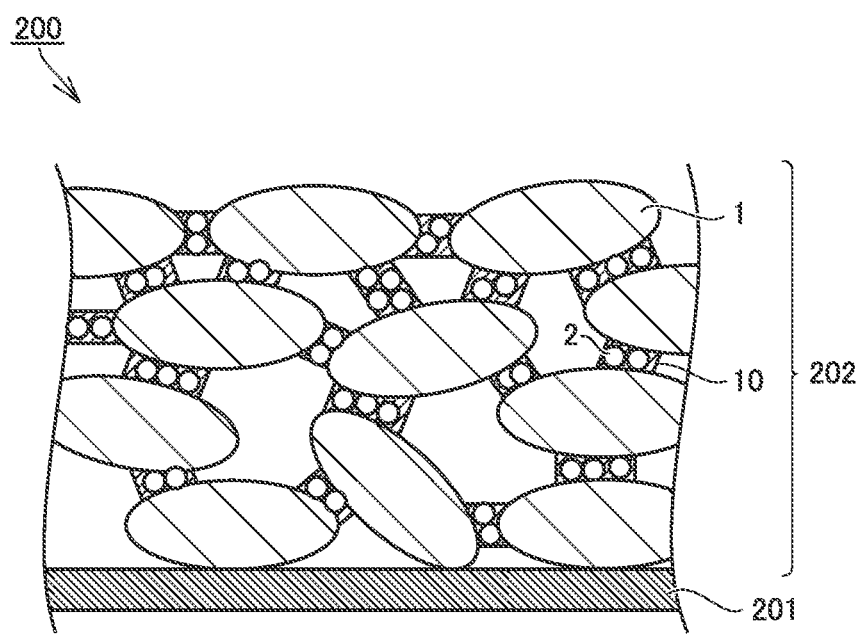
FIG. 2 is a conceptual cross-sectional view showing a negative electrode according to the present disclosure.

Negative electrode composite material layer 202 includes graphite-based particles 1, LTO particles 2, and the binder (FIG. 2). Each of these materials are described above in detail. Negative electrode composite material layer 202 includes LTO particles 2 in an amount not lower than 2 mass % and not higher than 15 mass % of the total amount of graphite-based particles 1 and LTO particles 2. When the mass ratio of LTO particles 2 is higher than 15 mass %, battery capacity can be very low. When the mass ratio of LTO particles 2 is lower than 2 mass %, inhibition of heat generation at the time of a short circuit can be insufficient.

Negative electrode composite material layer 202 may include LTO particles 2 in an amount not lower than 3 mass % and not higher than 10 mass % of the total amount of graphite-based particles 1 and LTO particles 2. When the amount is within this range, an improved balance is obtained between the extent of inhibition of heat generation and the battery capacity.

For example, negative electrode composite material layer 202 may include the binder in an amount not lower than 0.5 part by mass and not higher than 5 parts by mass relative to 100 parts by mass of the negative electrode active materials (the total amount of graphite-based particles 1 and LTO particles 2). For example, negative electrode composite material layer 202 may include the binder in an amount not lower than 1 part by mass and not higher than 2 parts by mass relative to 100 parts by mass of the negative electrode active materials.

<<SPM Electric-Current Amount>>

An SPM electric-current amount is measured in a cross section of negative electrode composite material layer 202. The SPM electric-current amount is an amount of an electric current flowing across an interface between adjacent ones of graphite-based particles 1. In the present embodiment, the SPM electric-current amount is not higher than 218 nA. When graphite-based particles 1, lithium titanate oxide particles 2, and the binder are positioned in such a way that the SPM electric-current amount is not higher than 218 nA, heat generation at the time of a short circuit is inhibited while a decrease in battery capacity is also inhibited.

It is considered that the lower the SPM electric-current amount is, the lower the amount of heat produced at the time of a short circuit is. For example, the SPM electric-current amount may be not higher than 199 nA. For example, the SPM electric-current amount may be not higher than 184 nA. The SPM electric-current amount may be not lower than 13 nA and not higher than 75 nA. When the SPM electric-current amount is within these ranges, heat generation at the time of a short circuit can be very low.

(Method of Measuring SPM Electric-Current Amount)

The SPM electric-current amount is measured in any cross section of negative electrode composite material layer 202. The cross-sectional sample used may be subjected to cross section polisher (CP) treatment or focused ion beam (FIB) treatment, for example.

When adjacent ones of graphite-based particles 1 are in direct contact with each other, the "interface" refers to the area of contact. When adjacent ones of graphite-based particles 1 are not in direct contact with each other, the "interface" refers to an area across which these adjacent ones of graphite-based particles 1 come closest to each other. The field of view of the SPM is adjusted so as to include the interface. The field of measurement is a rectangular area of 20 μm×20 μm. Within the field of measurement, area analysis (mapping) of the amount of electric current is carried out. The bias voltage is 3.0 V. As the SPM, "Dimension Icon" manufactured by Bruker or a similar product is used, for example. As the probe, conductive probe "DDESP" manufactured by Bruker or a similar product is used, for example. Based on the results of electric current mapping, an "amount of electric current flowing across an interface" is measured. Measurement of the "amount of electric current flowing across an interface" is carried out at at least ten fields of measurement. The arithmetic mean of these at least ten measurements of the "amount of electric current flowing across an interface" is used as the "SPM electric-current amount".

<<Linkage Portions>>

Negative electrode composite material layer 202 may further include linkage portions 10 (FIG. 2). Linkage portions 10 originate from liquid linkage portions 5 (FIG. 1). Each graphite-based particle 1 is linked to another via one of linkage portions 10. LTO particles 2 and the binder are contained in linkage portions 10. When these constituent materials are thus positioned, heat generation at the time of a short circuit may be low. When these constituent materials are thus positioned, linkage portions 10 are included in the paths of short-circuit currents. It is considered that because LTO particles 2 having a resistance increasing at the time of a short circuit are localized within linkage portions 10, the amount of a short-circuit current is low.

It is also considered that when these constituent materials are thus positioned, an SPM electric-current amount measured across an interface between adjacent ones of graphite-based particles 1 is low as well. The reason for this phenomenon is considered to be that when these constituent materials are thus positioned, linkage portions 10 can be formed at interfaces between adjacent ones of graphite-based particles 1.

<Lithium-Ion Secondary Battery>

Figure 6:
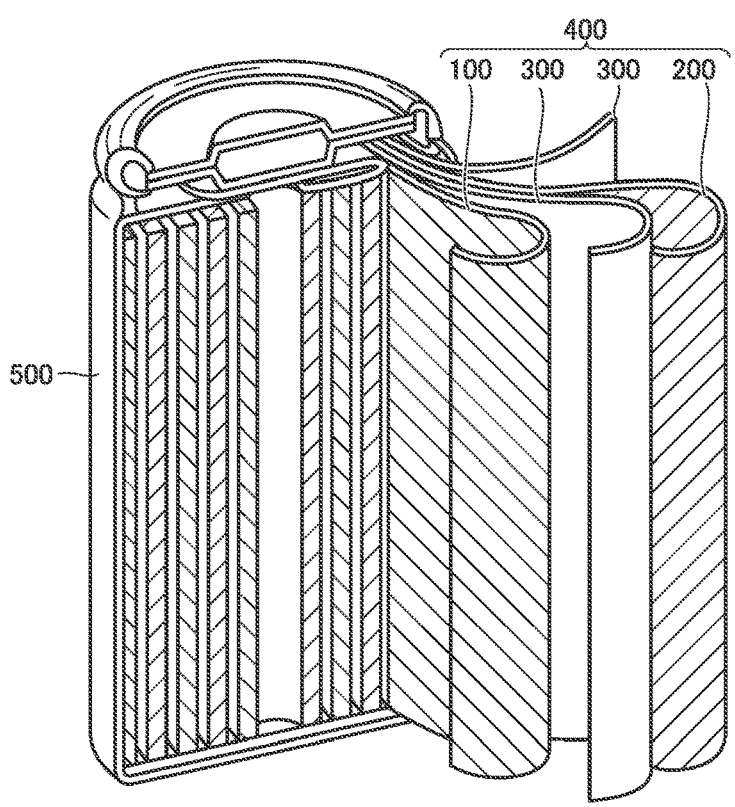
FIG. 6 is a schematic view showing an example of the configuration of a lithium-ion secondary battery according to the present embodiment.

FIG. 6 is a schematic view showing an example of the configuration of a lithium-ion secondary battery according to the present embodiment.

A battery 1000 includes a casing 500. Casing 500 is cylindrical. However, the shape of casing 500 is not limited to a cylindrical shape. Casing 500 may be prismatic (a flat, rectangular parallelepiped), for example.

Casing 500 is hermetically sealed. Casing 500 may be made of iron, stainless steel, or aluminum (Al) alloy, for example. Casing 500 may be, for example, a pouch made of an Al-laminated film or the like. In other words, battery 1000 may be a laminate-type battery. Casing 500 may be equipped with a current interrupt device (CID) and/or a gas-discharge valve, for example.

Casing 500 accommodates an electrode array 400 and an electrolyte. Electrode array 400 includes negative electrode 200, a positive electrode 100, and a separator 300. In other words, battery 1000 includes at least negative electrode 200. Negative electrode 200 is described above in detail. The battery 1000 has an acceptable level of battery capacity and produces only a low amount of heat at the time of a short circuit.

Electrode array 400 is a wound-type one. Electrode array 400 includes positive electrode 100, separator 300, negative electrode 200, and separator 300 that are stacked in this order and then wound in a spiral fashion.

Electrode array 400 may be a stack-type one. When electrode array 400 is a stack-type one, electrode array 400 is formed by alternately stacking positive electrode 100 and negative electrode 200. In the space between positive electrode 100 and negative electrode 200, separator 300 is interposed. In the following, components except negative electrode 200 are described.

<<Positive Electrode>>

Positive electrode 100 may be produced by known methods. Positive electrode 100 has a sheet form. Positive electrode 100 includes at least a positive electrode composite material layer. Positive electrode 100 may further include a positive electrode current collector. The positive electrode current collector may be made of Al foil or Al alloy foil, for example. The positive electrode current collector may have a thickness not smaller than 5 μm and not greater than 50 μm, for example.

For example, the positive electrode composite material layer may be formed on a surface of the positive electrode current collector. The positive electrode composite material layer may be formed on both sides of the positive electrode current collector. For example, the positive electrode composite material layer may have a thickness not smaller than 10 μm and not greater than 200 μm. The positive electrode composite material layer includes at least a positive electrode active material. The positive electrode composite material layer may further include a conductive material and a binder.

The positive electrode active material may be in particle form. For example, the positive electrode active material may have a D50 not lower than 1 μm and not higher than 30 μm. The positive electrode active material is not particularly limited. The positive electrode active material may be $LiCoO_2$, $LiNiO_2$, $LiMnO_2$, $LiMn_2O_4$, $LiNi_xCo_yM_zO_2$ (where M represents Mn or Al; and x, y, and z satisfy $0<x<1$, $0<y<1$, $0<z<1$, and $x+y+z=1$), or $LiFePO_4$, for example. One type of the positive electrode active material may be used alone. Two or more types of the positive electrode active material may be used in combination.

The conductive material is not particularly limited. For example, the conductive material may be carbon black. For example, the positive electrode composite material layer may include the conductive material in an amount not lower than 1 part by mass and not higher than 10 parts by mass relative to 100 parts by mass of the positive electrode active material. The binder is not particularly limited either. For example, the binder may be PVdF. For example, the positive electrode composite material layer may include the binder in an amount not lower than 1 part by mass and not higher than 10 parts by mass relative to 100 parts by mass of the positive electrode active material.

<<Separator>>

Separator 300 is a porous film. Separator 300 is interposed between positive electrode 100 and negative electrode 200. Separator 300 electrically insulates positive electrode 100 from negative electrode 200. Separator 300 may have a thickness not smaller than 10 μm and not greater than 50 μm, for example. Separator 300 may be made of polyethylene (PE) or polypropylene (PP), for example.

Separator 300 may have a monolayer structure, for example. Separator 300 may consist of a porous PE film, for example. Separator 300 may have a multilayer structure (such as a three-layer structure), for example. Separator 300 may be formed, for example, by stacking a porous PP film, a porous PE film, and a porous PP film in this order. Separator 300 may include a heat-resistant layer on a surface. The heat-resistant layer is porous. The heat-resistant layer contains a heat-resistant material. The heat-resistant material may be alumina, for example.

<<Electrolyte>>

The electrolyte may be any of a liquid electrolyte, a gelled electrolyte, or a solid electrolyte. For example, the liquid electrolyte may be an electrolyte solution or an ionic liquid. As an example of the electrolyte herein, an electrolyte solution is described below. The electrolyte solution contains a solvent and a supporting salt.

(Supporting Salt)

The supporting salt is dissolved in a solvent. For example, the electrolyte solution may contain the supporting salt in an amount not lower than 0.5 mol/l and not higher than 2 mol/l. For example, the supporting salt may be $LiPF_6$, $LiBF_4$, $Li[N(FSO_2)_2]$, or $Li[N(CF_3SO_2)_2]$. One type of the supporting salt may be used alone. Two or more types of the supporting salt may be used in combination.

(Solvent)

The solvent may contain a cyclic carbonate and a chain carbonate, for example. The mixing ratio of the cyclic carbonate and the chain carbonate may be (cyclic carbonate):(chain carbonate)=1:9 to 5:5, where the mixing ratio is a volume ratio, for example. The cyclic carbonate may be ethylene carbonate (EC), propylene carbonate (PC), butylene carbonate (BC), or fluoroethylene carbonate (FEC), for example. One type of the cyclic carbonate may be used alone. Two or more types of the cyclic carbonate may be used in combination.

The chain carbonate may be dimethyl carbonate (DMC), ethyl methyl carbonate (EMC), or diethyl carbonate (DEC), for example. One type of the chain carbonate may be used alone. Two or more types of the chain carbonate may be used in combination.

The solvent may contain a lactone, a cyclic ether, a chain ether, or a carboxylic acid ester, for example. The lactone may be γ-butyrolactone (GBL) or δ-valerolactone, for example. The cyclic ether may be tetrahydrofuran (THF), 1,3-dioxolane, or 1,4-dioxane, for example. The chain ether may be 1,2-dimethoxyethane (DME), for example. The carboxylic acid ester may be methyl formate (MF), methyl acetate (MA), or methyl propionate (MP), for example.

(Additives)

The electrolyte solution may further contain various additives in addition to the solvent and the supporting salt. For example, the electrolyte solution may contain the additives in an amount not lower than 0.005 mol/l and not higher than 0.5 mol/l. Examples of the additives include a gas generation agent (so-called anti-overcharging additive), and a solid electrolyte interface (SEI) film-forming agent.

The gas generation agent may be cyclohexylbenzene (CHB) or biphenyl (BP), for example. The SEI film-forming agent may be vinylene carbonate (VC), vinylethylene carbonate (VEC), $LiB(C_2O_4)_2$, $LiBF_2(C_2O_4)$, $LiPF_2(C_2O_4)_2$, $LiPO_2F_2$, propane sultone (PS), or ethylene sulfite (ES), for example. One type of the additives may be used alone. Two or more types of the additives may be used in combination.

<Uses>

In battery 1000 according to the present embodiment, a high battery capacity and inhibition of heat generation at the time of a short circuit are both obtained. For example, battery 1000 according to the present embodiment is suitable for power supplies for driving, for example, hybrid vehicles (HVs), plug-in hybrid vehicles (PHVs), and electric vehicles (EVs). It should be noted that the use of battery 1000 according to the present embodiment is not limited to vehicle-mounted applications. Battery 1000 according to the present embodiment may be used in any application.

EXAMPLES

In the following, examples according to the present disclosure are described. The scope of claims is not limited to the following description.

Example 1

The following materials were prepared.

Graphite-based particles 1: natural graphite (D50=15 μm)
LTO particles 2: $Li_4Ti_5O_{12}$ (D50 of primary particle size=0.2 μm)
Binder: CMC (thickening component)
Binder: SBR
Solvent: ion-exchanged water
Negative electrode current collector 201: Cu foil <<(A) Preparation of Particle-Dispersed Liquid>>

Powder consisting of LTO particles 2, the binders, and the solvent were mixed with a stirrer, and a particle-dispersed liquid was prepared. The stirrer was "Filmix" manufactured by PRIMIX Corporation. The stirring rate was 60 m/second. The stirring duration was 120 seconds. The resulting particle-dispersed liquid had a solid matter ratio of 9 mass %. The particle-dispersed liquid was prepared so as to have a viscosity of 9200 mP·s.

<<(B) Granulation>>

The particle-dispersed liquid and the powder consisting of graphite-based particles 1 were mixed in a stirring granulator. Thus, wet granules 20 were prepared. More specifically, the powder consisting of graphite-based particles 1 was granulated by using the particle-dispersed liquid and thus wet granules 20 were prepared. Wet granules 20 had a solid matter ratio of 68 mass %. The mass ratio of LTO particles 2 (the mass ratio of LTO particles 2 to the total of graphite-based particles 1 and LTO particles 2) was 5 mass %.

<<(C) Formation>>

Electrode production apparatus 2000 (FIG. 5) was prepared. Electrode production apparatus 2000 was used to form wet granules 20 into negative electrode composite material layer 202. Negative electrode composite material layer 202 was placed on a surface of negative electrode current collector 201. Thus, negative electrode 200 of Example 1 was produced.

Examples 2 to 5

Negative electrode 200 was produced in the same manner as in Example 1 except that the mass ratio of LTO particles 2, the viscosity of the particle-dispersed liquid, and the solid matter ratio of the particle-dispersed liquid were changed as specified in Table 1 below.

Examples 6, 7, and 9

Negative electrode 200 was produced in the same manner as in Example 4 except that the particle size ratio ($D50_{Gr}/D50_{LTO}$) was changed as specified in Table 1 below.

Example 8

Negative electrode 200 was produced in the same manner as in Example 4 except that the particle size ratio ($D50_{Gr}/D50_{LTO}$) and the viscosity of the particle-dispersed liquid were changed as specified in Table 1 below.

Example 10

Negative electrode 200 was produced in the same manner as in Example 6 except that the mass ratio of LTO particles 2, the viscosity of the particle-dispersed liquid, and the solid matter ratio of the particle-dispersed liquid were changed as specified in Table 1 below.

Comparative Example 1

Figure 7:
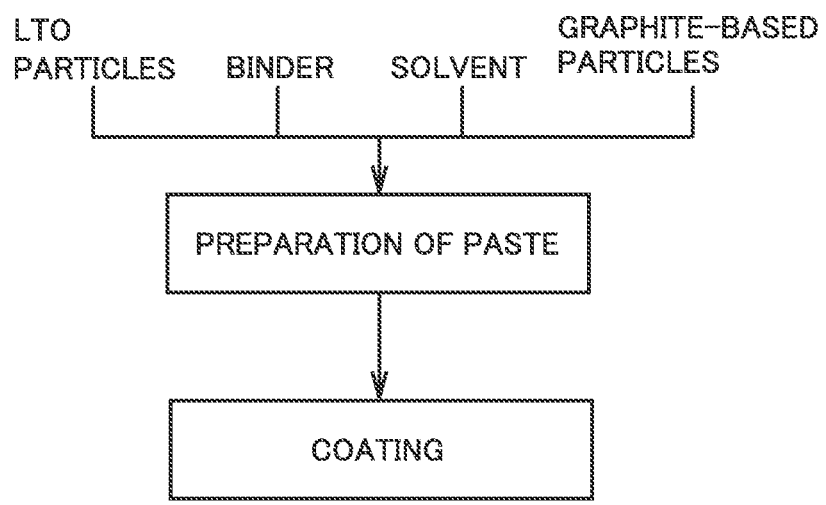
FIG. 7 is a flow chart of production of a negative electrode in any one of Comparative Examples 1 to 4.

FIG. 7 is a flow chart of production of a negative electrode of each of Comparative Examples 1 to 4.

Figure 3:
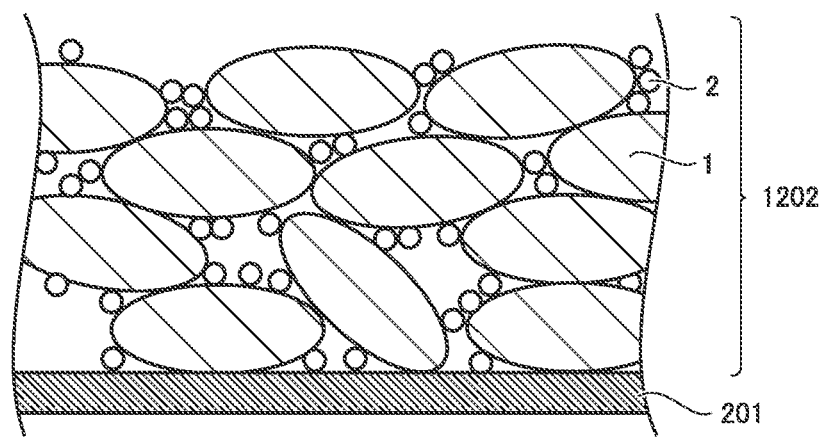
FIG. 3 is a conceptual cross-sectional view showing a negative electrode according to a reference embodiment.

In Comparative Examples 1 to 4, negative electrode composite material layer 1202 was formed by using a paste (FIG. 3). The paste was prepared by homogeneously dispersing the powder consisting of graphite-based particles 1, the powder consisting of LTO particles 2, and the binders in a solvent with a stirrer (a typical homomixer). The paste was prepared so as to have a solid matter ratio of 50 mass %. The paste was applied to a surface of negative electrode current collector 201 with a coating apparatus (a typical die coater), followed by drying. Thus, negative electrode composite material layer 1202 was formed. In this way, a negative electrode of Comparative Example 1 was produced.

Comparative Examples 2 to 4

A negative electrode was produced in the same manner as in Comparative Example 1 except that the mass ratio of LTO particles 2 was changed as specified in Table 1 below.

Comparative Example 5

Figure 8:
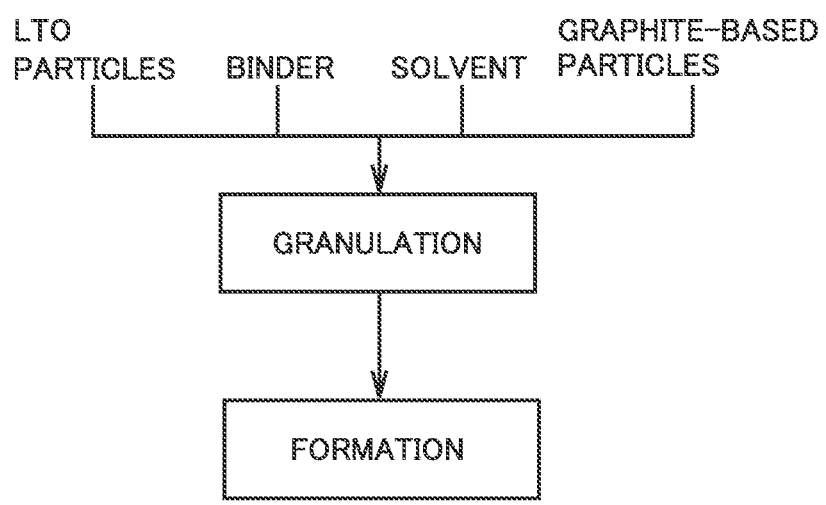
FIG. 8 is a flow chart of production of a negative electrode in Comparative Example 5.

FIG. 8 is a flow chart of production of a negative electrode of Comparative Example 5.

The powder consisting of graphite-based particles 1, the powder consisting of LTO particles 2, the binders, and the solvent were all mixed together in a stirring granulator, and thus wet granules were prepared. More specifically, in Comparative Example 5, the powder consisting of graphite-based particles 1 and the powder consisting of LTO particles 2 were granulated by using the binders and the solvent and thus the wet granules were prepared. In the same manner as in Example 1 except for this procedure, a negative electrode was produced. Comparative Example 5 is an example in which no particle-dispersed liquid was used.

<Evaluation>
<<SPM Electric-Current Amount>>

A cross-sectional sample of negative electrode composite material layer 202 was prepared. The cross section of the cross-sectional sample was parallel to the thickness direction of negative electrode composite material layer 202. An SPM electric-current amount was measured by the method described above. Results are shown in Table 1 below.

<<Battery Capacity>>

Positive electrode 100, separator 300, an electrolyte (electrolyte solution), and casing 500 were prepared. Positive electrode 100, separator 300, and negative electrode 200 were stacked in this order and thus electrode array 400 was formed. Electrode array 400 and the electrolyte were placed within casing 500. Casing 500 was hermetically sealed. Thus, battery 1000 (lithium-ion secondary battery) was produced. Battery 1000 includes at least negative electrode 200.

The battery capacity of battery 1000 was measured. Results are shown in Table 1 below. Each value in column "battery capacity" in Table 1 below is a value relative to the battery capacity in Comparative Example 1, which was defined as 100. A battery capacity not lower than 90 is considered to be acceptable.

<<Nail Penetration Test>>

Battery 1000 was subjected to a nail penetration test. During the nail penetration test, the surface temperature of casing 500 was measured. The "maximum temperature" in Table 1 below means the highest surface temperature measured during the nail penetration test. It is considered that the lower the maximum temperature is, the greater the inhibition of heat generation at the time of a short circuit is.

TABLE 1

List of Examples and Comparative Examples

| | Method of producing negative electrode | | | | | | | | Negative electrode composite material layer | Evaluation | | |
|---|---|---|---|---|---|---|---|---|---|---|---|---|
| | Solid matter composition | | | | Particle size ratio $D50_{GR}/D50_{LTO}$ | | Particle-dispersed liquid | | | | | |
| | Graphite-based particles parts by mass | LTO particles parts by mass | Binder | | | Production flow | Viscosity mPa·S | Solid matter ratio mass % | SPM electric-current amount nA | Maximum temperature ° C. | Battery capacity |
| | | | SBR parts by mass | CMC parts by mass | | | | | | | | |
| Comp. Ex. 1 | 95 | 5 | 1 | 0.5 | 250 | FIG. 7 (Paste coating) | — | — | 463 | 639 | 100 |
| Comp. Ex. 2 | 90 | 10 | 1 | 0.5 | 250 | FIG. 7 (Paste coating) | — | — | 383 | 621 | 97 |
| Comp. Ex. 3 | 80 | 20 | 1 | 0.5 | 250 | FIG. 7 (Paste coating) | — | — | 329 | 623 | 91 |
| Comp. Ex. 4 | 70 | 30 | 1 | 0.5 | 250 | FIG. 7 (Paste coating) | — | — | 13 | 96 | 85 |
| Comp. Ex. 5 | 95 | 5 | 1 | 0.5 | 250 | FIG. 8 (Granulation all together) | — | — | 246 | 541 | 100 |
| Ex. 1 | 95 | 5 | 1 | 0.5 | 250 | FIG. 4 (Granulation w/particle-dispersed liquid) | 9200 | 9 | 218 | 432 | 100 |
| Ex. 2 | 98 | 2 | 1 | 0.5 | 250 | FIG. 4 (Granulation w/particle-dispersed liquid) | 2300 | 3.6 | 184 | 320 | 102 |
| Ex. 3 | 97 | 3 | 1 | 0.5 | 250 | FIG. 4 (Granulation w/particle-dispersed liquid) | 4300 | 5.4 | 75 | 89 | 101 |

TABLE 1-continued

List of Examples and Comparative Examples

| | Method of producing negative electrode | | | | | | Negative electrode composite material layer Evaluation | | | |
|---|---|---|---|---|---|---|---|---|---|---|
| | Solid matter composition | | | | | Particle-dispersed liquid | | | | |
| | Graphite-based particles parts by mass | LTO particles parts by mass | Binder SBR parts by mass | Binder CMC parts by mass | Particle size ratio D50$_{GR}$/D50$_{LTO}$ | Production flow | Viscosity mPa·S | Solid matter ratio mass % | SPM electric-current amount nA | Maximum temperature °C. | Battery capacity |
| Ex. 4 | 95 | 5 | 1 | 0.5 | 250 | FIG. 4 (Granulation w/particle-dispersed liquid) | 5600 | 9 | 43 | 67 | 100 |
| Ex. 5 | 90 | 10 | 1 | 0.5 | 250 | FIG. 4 (Granulation w/particle-dispersed liquid) | 7000 | 18 | 54 | 62 | 97 |
| Ex. 6 | 95 | 5 | 1 | 0.5 | 150 | FIG. 4 (Granulation w/particle-dispersed liquid) | 5600 | 9 | 25 | 78 | 100 |
| Ex. 7 | 95 | 5 | 1 | 0.5 | 100 | FIG. 4 (Granulation w/particle-dispersed liquid) | 5600 | 9 | 36 | 85 | 100 |
| Ex. 8 | 95 | 5 | 1 | 0.5 | 20 | FIG. 4 (Granulation w/particle-dispersed liquid) | 4300 | 9 | 31 | 97 | 100 |
| Ex. 9 | 95 | 5 | 1 | 0.5 | 10 | FIG. 4 (Granulation w/particle-dispersed liquid) | 5600 | 9 | 199 | 352 | 100 |
| Ex. 10 | 85 | 15 | 1 | 0.5 | 150 | FIG. 4 (Granulation w/particle-dispersed liquid) | 6200 | 27 | 13 | 55 | 94 |

<Results>

Examples 1, 4, and 6 to 9 and Comparative Examples 1 and 5 have the same mass ratio of LTO particles 2. The battery capacity in Examples 1, 4, and 6 to 9 is equivalent to the battery capacity in Comparative Examples 1 and 5. The maximum temperature in any of Examples 1, 4, and 6 to 9 is lower than the maximum temperature in any of Comparative Examples 1 and 5. Therefore, it is considered that in Examples 1, 4 and 6 to 9, compared to Comparative Examples 1 and 5, heat generation at the time of a short circuit was inhibited while a decrease in battery capacity was also inhibited.

The mass ratio of LTO particles 2 in either of Examples 2 and 3 is lower than that in either of Comparative Examples 1 and 5. The battery capacity in either of Examples 2 and 3 is equivalent to or higher than the battery capacity in Comparative Examples 1 and 5. The maximum temperature in either of Examples 2 and 3 is lower than that in either of Comparative Examples 1 and 5. Therefore, it is considered that in Examples 2 and 3, compared to Comparative Examples 1 and 5, heat generation at the time of a short circuit was inhibited while a decrease in battery capacity was also inhibited.

Examples 5 and Comparative Example 2 have the same mass ratio of LTO particles 2. The battery capacity in Examples 5 is equivalent to the battery capacity in Comparative Example 2. The maximum temperature in Examples 5 is lower than that in Comparative Example 2. Therefore, it is considered that in Examples 5, compared to Comparative Example 2, heat generation at the time of a short circuit was inhibited while a decrease in battery capacity was also inhibited.

The mass ratio of LTO particles 2 in Example 10 is lower than that in either of Comparative Examples 3 and 4. Yet, the maximum temperature in Example 10 is lower than that in either of Comparative Examples 3 and 4. The battery capacity in Example 10 is higher than the battery capacity in Comparative Examples 3 and 4. Therefore, it is considered that in Example 10, compared to Comparative Examples 3 and 4, heat generation at the time of a short circuit was inhibited while a decrease in battery capacity was also inhibited.

Comparative Example 4 has a low maximum temperature. Yet, the battery capacity in Comparative Example 4 is very low. Therefore, it is considered that in Comparative Example 4, heat generation at the time of a short circuit was inhibited but a decrease in battery capacity was not inhibited.

From the above results, it is considered that in any of Examples 1 to 10, compared to the comparative examples, heat generation at the time of a short circuit was inhibited while a decrease in battery capacity was also inhibited.

There is a correlation observed between the SPM electric-current amount and the maximum temperature. In Examples 1 to 10, the SPM electric-current amount is not higher than 218 nA. In Comparative Examples 1 to 3 and 5, the SPM electric-current amount is higher than 218 nA. It is considered that in the production flow in any of Comparative Examples 1 to 3 and 5, LTO particles 2 were not likely to be localized in a particular location where LTO particles could effectively inhibit short-circuit currents if localized. As is clear from the results in Comparative Example 4, in the production flow in any of Comparative Examples 1 to 4, a large quantity of LTO particles 2 is required in order to inhibit heat generation at the time of a short circuit.

In Examples 1 to 10, when the SPM electric-current amount is not lower than 13 nA and not higher than 75 nA, the maximum temperature tends to be very low.

In Examples 1 to 5, when the viscosity of the particle-dispersed liquid is not lower than 4300 mPa·s and not higher than 7000 mPa·s, the maximum temperature tends to be low.

In Examples 4 and 6 to 9, when the particle size ratio ($D50_{Gr}/D50_{LTO}$) is not lower than 20 and not higher than 250, the maximum temperature tends to be low.

The embodiments and examples disclosed herein are illustrative and non-restrictive in any respect. The technical scope indicated by the claims is intended to include any modifications within the scope and meaning equivalent to the terms of the claims.

What is claimed is:

1. A negative electrode of a lithium-ion secondary battery, the negative electrode comprising:
   at least a negative electrode composite material layer,
   the negative electrode composite material layer including graphite-based particles, lithium titanate oxide particles, and a binder,
   the negative electrode composite material layer including the lithium titanate oxide particles in an amount not lower than 3 mass % and not higher than 5 mass % of a total amount of the graphite-based particles and the lithium titanate oxide particles,
   a ratio of a D50 of the graphite-based particles to a D50 of the lithium titanate oxide particles is not lower than 20 and not higher than 250,
   the graphite-based particles are linked to each other via linking portions consisting of the lithium titanate oxide particles and binder with no direct contact between graphite-based particles and an amount of an electric current flowing across an interface between adjacent ones of the graphite-based particles measured in a cross section of the negative electrode composite material layer with a scanning probe microscope is not lower than 13 nA and not higher than 75 nA, and
   the graphite-based particles contain natural graphite, artificial graphite, soft carbon, hard carbon, or combinations thereof.

2. A lithium-ion secondary battery comprising at least the negative electrode according to claim 1.

3. The negative electrode according to claim 1, wherein:
   the lithium titanate oxide particles have a D50 of not lower than 0.01 μm and not higher than 1 μm; and
   the graphite-based particles have a D50 of not lower than 1 μm and not higher than 30 μm.

4. The negative electrode according to claim 1, wherein the binder is selected from the group consisting of styrene-butadiene rubber, carboxymethylcellulose, polyvinyl alcohol, polyvinylidene difluoride, vinylidene fluoride-hexafluoropropene, polytetrafluoroethylene, polyimide, polyacrylic acid, acrylic polymer, and combinations thereof, where the acrylic polymers are polymer formed by polymerization of at least one monomer selected from the group consisting of acrylic acid esters, methacrylic acid esters, acrylonitrile, and combinations thereof.

5. The negative electrode according to claim 1, wherein a ratio of the lithium titanate oxide particles to the binder is from 3:2.5 to 30:2.5.

6. A negative electrode prepared by a process comprising:
   mixing a powder consisting of lithium titanate oxide particles, a binder, and a solvent to prepare a particle-dispersed liquid;
   after mixing the lithium titanate oxide particles, binder, and solvent to prepare the particle-dispersed liquid, granulating a powder consisting of graphite-based particles by using the particle-dispersed liquid to prepare wet granules; and
   forming the wet granules into a negative electrode composite material layer; and
   placing the negative electrode composite material layer on a surface of a negative electrode current collector to produce the negative electrode comprising the negative electrode composite material layer disposed on the negative electrode current collector,
   wherein:
   the negative electrode composite material layer includes the lithium titanate oxide particles in an amount not lower than 3 mass % and not higher than 5 mass % of a total amount of the graphite-based particles and the lithium titanate oxide particles;
   a ratio of a D50 of the graphite-based particles to a D50 of the lithium titanate oxide particles is not lower than 20 and not higher than 250;
   the graphite-based particles are linked to each other via linking portions consisting of the lithium titanate oxide particles and the binder with no direct contact between graphite based particles;
   an amount of an electric current flowing across an interface between adjacent ones of the graphite-based particles measured in a cross section of the negative electrode composite material layer with a scanning probe microscope is not lower than 13 nA and not higher than 75 nA; and
   the graphite-based particles contain natural graphite, artificial graphite, soft carbon, hard carbon, or combinations thereof.

7. The negative electrode according to claim 6, comprising a ratio of the lithium titanate oxide particles to the binder of from 3:2.5 to 20:2.5 by mass.

8. The negative electrode according to claim 7, wherein the particle-dispersed liquid has a viscosity of not lower than 2300 mPa·s and not higher than 9200 mPa·s.

9. The negative electrode according to claim 6, wherein a ratio of the lithium titanate oxide particles to the binder is from 3:2.5 to 30:2.5.

10. The negative electrode according to claim 6, wherein the binder comprises carboxymethylcellulose and styrene-butadiene rubber.

* * * * *